US011170282B1

(12) United States Patent
Mohammad et al.

(10) Patent No.: US 11,170,282 B1
(45) Date of Patent: Nov. 9, 2021

(54) SYSTEMS AND METHODS FOR SIMULTANEOUS COMMUNICATION TO A PLURALITY OF PERSONAL DEVICES WITH RFID TAGS AND LEDS

(71) Applicant: Semnox Solutions, LLC, Farmers Branch, TX (US)

(72) Inventors: Iqbal Mohammad, Mangalore (IN); Kiran Karanki, Mangalore (IN)

(73) Assignee: Semnox Solutions Private Limited, Mangalore (IN)

( * ) Notice: Subject to any disclaimer, the term of this patent is extended or adjusted under 35 U.S.C. 154(b) by 0 days.

(21) Appl. No.: 16/833,934

(22) Filed: Mar. 30, 2020

(51) Int. Cl.
| | |
|---|---|
| *G06K 5/00* | (2006.01) |
| *G06K 19/077* | (2006.01) |
| *G07C 9/00* | (2020.01) |
| *G09F 3/00* | (2006.01) |
| *G06F 1/16* | (2006.01) |
| *G08B 5/36* | (2006.01) |
| *G06K 7/10* | (2006.01) |

(52) U.S. Cl.
CPC ....... *G06K 19/07762* (2013.01); *G06F 1/163* (2013.01); *G06K 7/10396* (2013.01); *G07C 9/00174* (2013.01); *G08B 5/36* (2013.01); *G09F 3/005* (2013.01); *G07C 2009/00968* (2013.01)

(58) Field of Classification Search
CPC .......... G06K 19/07762; G06K 7/10396; G06F 1/163
USPC ........................................................ 235/380
See application file for complete search history.

(56) References Cited

U.S. PATENT DOCUMENTS

| | | | | |
|---|---|---|---|---|
| 8,006,899 B2 * | 8/2011 | Wein | ........................ | G07C 9/28 235/382 |
| 2014/0184386 A1 * | 7/2014 | Regler | ................. | H05B 47/155 340/7.61 |
| 2020/0202259 A1 * | 6/2020 | Schueler | .............. | G06Q 20/206 |

* cited by examiner

*Primary Examiner* — Ahshik Kim
(74) *Attorney, Agent, or Firm* — Andrew C Aitken

(57) ABSTRACT

A communication system ad methods that includes a RFID tag writer to assign a unique identification to RFID tags, a series of personal communication devices, that have an RFID tag, a processor, a signal receiver and a display, and processors provide instructions to the displays to provide different light sequences in response to signals received, and a central controller that includes a processor, a transceiver and a memory, where the memory stores information relating to the RFID tags, user accounts and has an input device that allows users to be segregated into defined groups and stored, and the controller receives signals from tag readers or communication devices and transmit signals to the personal communication devices to affect the displays.

4 Claims, 6 Drawing Sheets

SYSTEMS AND METHODS FOR SIMULTANEOUS COMMUNICATION TO A PLURALITY OF PERSONAL DEVICES WITH RFID TAGS AND LEDS

FIELD OF THE INVENTION

This invention relates generally to systems, methods, and devices to manage retail customers using services with RFID wristbands and more particularly to wristbands that can be activated to communicate signals to the customer and to retail service employees that are in proximity to the customer.

BACKGROUND OF THE INVENTION

RFID tags are routinely currently used to track items though a supply chain. When an RFID tag is applied to a wristband, it can be used as device to track the user and allow the wearer access to events or activities by scanning the tag at entrance locations or gates to a confined area. For example, in a Family Entertainment Center, RFID wristbands may be used to allow the wearer access to specific play areas, such as trampolines, ball pits, or obstacle courses. Such wristbands may also be used in amusement or water parks to allow access to rides or other attractions.

Wristband devices having lighting elements are commercially available wristbands from companies such as Xylobands, Unit 5, Wessex Business Centre, Westbury, Wiltshire, BA13 3EG, United Kingdom and Klik, 103 Louvain Street W, Montreal, QC Canada. These products are radio-controlled devices with LED arrays designed to create a light show at live events, such as concerts and sporting events. The wristbands are programmed to create multiple flash patterns and other visual effects with RGB color changing LEDs and can be controlled from a remote location.

In prior art environments, alerting a customer who is involved in an amusement activity or an event, such as alerting a customer that the time has elapsed for the activity or that a target outcome was achieved, was typically performed by manual intervention by staff members. Also, in general, personally identifiable information was required to identify the individual in the environments which required storing of customer sensitive data, such as email or other contact information such as a phone number. However, many patrons are reluctant to provide such information and often patrons are children and do not have such accounts. In a first example, a time-based activity for each individual user needs to be therefore manually monitored and the time expiry of the event needs to be communicated to him manually on completion of the time limit. While some activities such as skating and roller-skating rinks have defined starting and ending times to address this issue, allowing users to any start and end at any time is more convenient to patrons and therefore can increase sales.

In another example such as in defined group activities, the actions or performance by each user may have to be tracked through a services of events of actions. Accordingly, depending on performance or participation, a user may continue to participate in the activity or may not be eligible for next stage. As such, systems and methods for user level identification and alerting of such completion of such events and user status are useful and needed.

SUMMARY OF THE INVENTION

The present disclosure describes a system, method and related devices, including an improved RFID bracelet and associated logic that allows for the management of an event facilities such as family entertainment centers or related attractions. The wearable devices are designed to communicate with the wearer as well as to signal to management employees in proximity to the wearer a status. In this regard, the bracelets include an RFID tag, a light display as well as a receiver that can receive signals from a central location and then processes the signals to provide a visible signal in the form of lighting effects.

In alternative embodiments, the wrist band includes a vibratory device to provide a tactile signal to the wearer. In yet further embodiments, the wrist band includes further features that include a wireless transmitter, a loudspeaker, a timer function, and a geolocation feature. In embodiments the light emitting aspect of the device emit a plurality of different colored lights and the signal can be processed to cause the lights to activate in a variety of different sequences.

In an exemplary process using the wristband, a customer checks in to a recreation area, such as a Family Entertainment Center (FEC) at a point of sale location and purchases a time duration for an activity in a restricted area, such as a trampoline park, play area, ski area, or concert arena. Next, the customer is issued a wristband having a unique RFID tag and radio receiver address. The customer can then use the RFID tag to enter a restricted or confined area. After a predetermined time has elapsed, the wristband provides an output signal to the user in the form of illumination of lights or a change in the illumination of lights on the wristband. The illumination patterns are visible to the customer as well as management staff.

The time duration may be measured using a timer integral to the device or may be tracked at a central server. In an embodiment, when a predetermined time duration has elapsed, the central server will send a signal to the wristband to provide an output reflecting the time status. In other embodiments, additional signals are be transmitted to the wristband, (1) to change the light display illumination and or the light colors to signal a countdown reflecting the imminent end of a time period, (2) to change the light display illumination sequence and or the light colors on the wrist band to signal that a timer period for access to a restricted area has elapsed. In addition, the central server can provide other instruction signals to the wristbrand to signal users and staff that another event will start, such as serving food, or the initiation of a performance.

In yet a further embodiment, the lighting on the wrist band may be activated or altered to reflect that the wearer is outside a restricted or confined area. In a further contemplated embodiment, the central server sends a signal to a RFID tag reader to cause the tag to not be recognized and thereby denying access to confined areas or access to game play on a machine or apparatus.

In another embodiment output signals from the wristband processor in response to the signal from the central server is in the form of a vibration, audio message or alarm. In a further embodiment the lights may be programmed to flash in different sequences to communicate different conditions to the user, for example, the lights may blink on and off before a change of color, or begin to blink on and off after a predetermined time has elapsed and the user has not left a restricted area. The timing of the sequence of the activation and deactivation of lights, as well as the colors, may be controlled by the central server.

In further embodiments of the invention, groups of patrons are created, such as birthday parties, school groups, corporate outings or family groups, and a control center can provide simultaneous signals to each member of the groups in a facility, alerting them to a condition, a status or an event.

DETAILED DESCRIPTION

Figure 1:
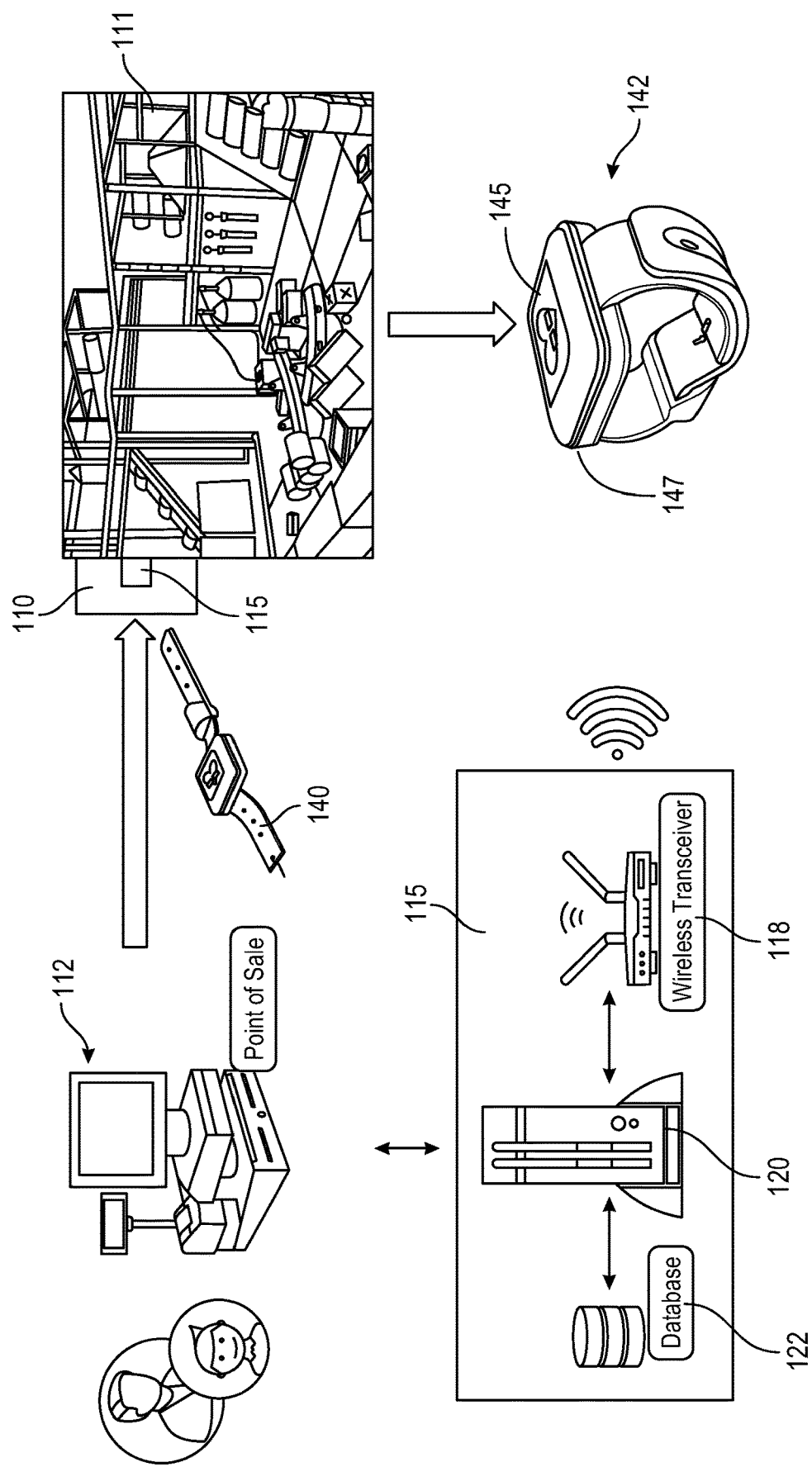
FIG. 1 is a schematic diagram of a system of the invention.

Now referring to FIG. 1, an exemplary invention of the present invention is used in connection with a facility such as a family entertainment center (FEC) that may include a number of attractions, including arcade games, play areas, entertainment areas, trampolines, obstacle courses, bounce houses and slides, shows and play areas. Other facilities that the invention may be used include amusement parks having attractions such as games and rides, water parks, sporting facilities such as athletic fields and gymnasiums with related equipment, parks, health and fitness clubs, ski areas, roller skating rinks, ice rinks, paintball facilities, go carts, mini golf, and escape rooms. The facility may be shared with a number of people or number of groups. Upon entry to the facility each patron is issued a wristband at a point of sale or check-in location 105. In each of the embodiments, the wristband includes a battery, a lighting element and a receiver that allows the band to receive control signals from a central location that will affect the light display. At the point of sale location, the user may purchase time for certain activities, associate with a group and or a team, and enroll in activities or events. Groups may be created by the facility, or users may create their own groups such a birthday party groups, corporate groups, and a school or church groups. Groups can be further divided into separate teams. At the check-in location, instructions may be provided relating the RFID tag readers provided throughout the facility, the significance of the light signals from the wristbands and be provided applicable game rules and procedures.

FIG. 1 depicts an exemplary tag reader 110 that is a fixed tag reader that is set up to create a specific interrogation zone which can be tightly controlled. This allows a highly defined reading area for when tags go in and out of the interrogation zone. The tag reader depicted in this embodiment also controls a gate 115 that allow access to a confined play area 111, similar to a subway turnstile. It is contemplated that other tag readers may a trigger audio and visual information and be used to confirm that a user is present at a location RFID tag readers communicate with the RFID tags according to standards such as ISO 18000 and EPCglobal. In embodiments, tags used are class 2, 3 4 or 5 having read write memory function. Tag readers 110 is configured to communicate with a central control station 115 and, in an embodiment uses a wireless standard such as using an 802.11 protocols or bluetooth. In embodiments the tag readers may be on mobile units such wheeled items or persons and a user may be tasked with the identification of a mobile tag reader as well as be required to track down its location within a facility and access the tag reader with the wristband tag. Central control station 115 includes a transceiver 118, a processor 120 and a database 122. Data relating to the user, the user's enrollment status, including the timer period purchased, events, activities and the user's associated groups and teams is collected and entered at check in location 112 and then transmitted and stored in database 122. The system of the invention also includes a plurality of wristbands such as wristband 140. Wristband 142 as depicted in FIG. 1 has a central display 145 that is surrounded by a LED section 147.

Figure 2:
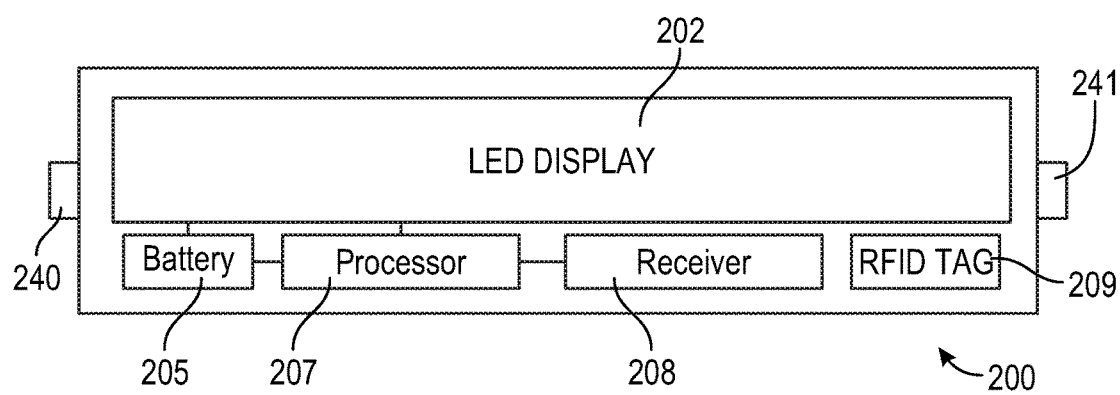
FIG. 2 is a schematic diagram of a first embodiment of a wristband that can be used according to the invention.

Referring now to FIG. 2, exemplary bracelet 200 is made from a flexible polymer or cloth and includes a light display region 202. In alternatives, the LED display may be configured as a display screen. In a first embodiment the bracelet is provided with a plurality of single-color LEDs strips that circle the bracelet. In an alternative embodiment, the bracelet uses RGB LEDs that make it possible to create a blend of light colors from red, blue, and green emitters placed next to each other on a circuit board, and eventually, within the same lens. Pixels are provided with a miniature controller associated with each LED, allowing any light in a connected chain to receive individual instructions via serial communication.

In an embodiment, the RGB LED pixels are assembled in chains which transmit power, ground, data, and (sometimes) clock signals to other pixels downstream in the array. The ability to control each RGB LED pixel independently allows for the construction of a bracelet having a wide variety of animation effects that can be created using software.

In an alternative embodiment, EL wire is used for the light source on the bracelet at region 202. EL Wire, also known as Electroluminescent wire, is a stiff wire core coated with phosphor and then covered with a protective PVC sheath. Unlike strand lights such as those comprised of LEDs. EL wire is not a series of points, but produces a 360-degree unbroken line of visible light. Its thin diameter makes it flexible and ideal for use in a variety of applications such as clothing or costumes. EL wire's construction consists of five major components. First is a solid-copper wire core coated with phosphor. A very fine wire or pair of wires is spiral-wound around the phosphor-coated copper core and then the outer ITO conductive coating is evaporated on. This fine wire is electrically isolated from the copper core. Surrounding this "sandwich" of copper core, phosphor and fine copper wire is a clear or colored PVC sleeve.

When an AC signal is applied to an EL wire, it glows an aqua (blue green) color. Sometimes its covered with a colored plastic shell to make it appear another color. EL Wire has the appearance of thin neon light and can be bent and will keep its shape. While El wire is not as bright as LEDs it uses less power. EL wire requires a driver/inverter that can provide 400-2000 Hz, 60-120 VAC. The application of higher frequency/voltage will result in a brighter wire. The LC circuit has been replaced for some applications with a single chip switched capacitor inverter IC such as the Supertex HV850; this device can run 30 cm of angel hair wire at high efficiency and is suitable for the wristband applications. An advantage of these chips is that the control signals can be derived from a microcontroller, so brightness and color can be varied programmatically and remotely controlled.

Bracelet 200 includes a battery 205 a processor 207 and a receiver 208. Receiver 208 can receive signals from central control station 15 and signals from the receiver are processed using processor 207. Still referring to FIG. 2, element 209 of bracelet 200 is an RFID tag. In general, RFID systems use tags or labels that are attached to the objects to be identified. An RFID reader uses electromagnetic fields to automatically identify and track the tags that are attached to objects. The RFID tag itself consists of a second small radio transponder, a radio receiver and transmitter. When triggered by an electromagnetic interrogation pulse from a nearby RFID reader device, the tag transmits digital data, typically an identifying number or ID, back to the reader. The two-way radio transmitter-receivers called, interrogators or readers, send a signal to the tag and then read its response. In turn these, these readers typically transmit their observations to a computer system running RFID software or RFID middleware. The tag's information is then stored electronically in a non-volatile memory.

RFID tags can be either passive, active or battery assisted passive. An active tag uses a battery and will periodically transmit an ID signal. A battery assisted passive (BAP) also uses a small battery and is activated when in the presence of the RFID reader. Passive tags are less expensive and smaller because no battery is required. The passive tag uses the radio energy transmitted by the reader as its energy source. For passive tags, the reader must be placed in close proximity to an RF field that is strong enough to transfer sufficient power to the tag. Since tags have individual identification RFID reader systems can discriminate several tags that might be within the range of the RFID reader and read them simultaneously. Tags may either be read-only, having a factory-assigned serial number that is used as a key into a database, or a tag may be read/write, where object-specific data can be written into the tag by the system user.

Figure 3:
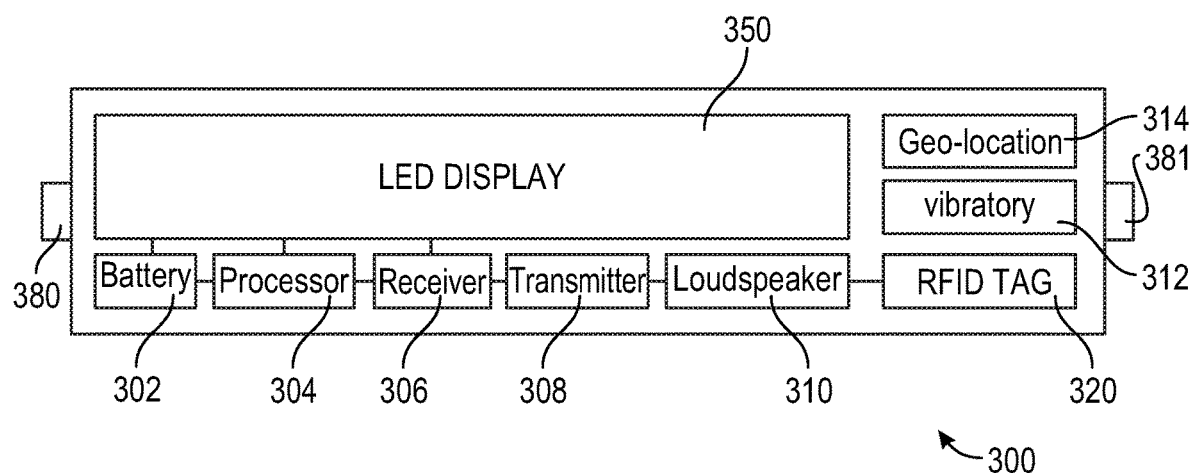
FIG. 3 is a schematic diagram of a second embodiment of a wristband used with the present invention.

FIG. 3 is a schematic view of an alternative embodiment of a wristband 300 that, like wristband 200, has a LED display 350 and RFID tag 320 adapted to communication with tag readers. This device also includes a battery 302, a processor 304, a receiver 306 adapted to communicate with central control station 115. Wristband 300 also includes additional features such as a loudspeaker 310, a vibratory device 312 and a geo-location microprocessor and receiver 314. Wristband 300 includes fastening device elements 380 and 381 which allows the band to be attached to the wrist of the user. The fastening device may be a buckle, a hood and loop fastener or magnetic clasp. In alternative embodiments, the wristband may have an elastic section to allow the band to conform to an individual's wrist.

Figure 4:
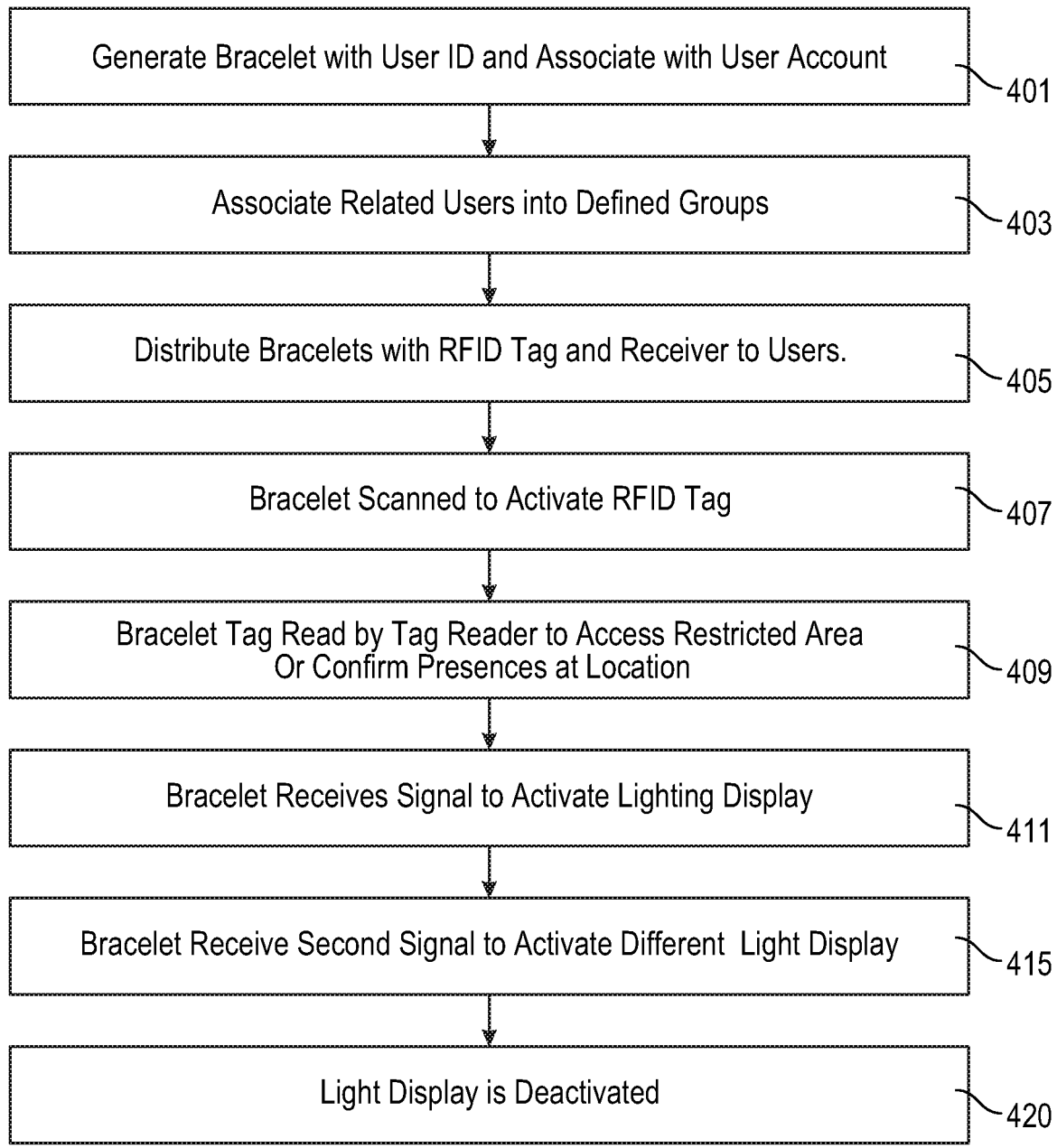
FIG. 4 is a flow chart describing the steps of a method of the invention using the system and devices as described above.

Now referring to FIG. 4, according to a method of the invention, at step 401, first a unique user ID is generated and uploaded through the software to one or more servers via a network for each customer and an account is associated with each bracelet. Next, optionally, at step 403 groups of related users or accounts are organized in a database that will allow the same control signal to be simultaneously sent to each member of the respective group, team or both. Next, at step 405. RFID bracelets are distributed to each user. At step 407, the bracelet is scanned to activate the RFID tag to the user. Next, at step 409 the bracelet is read by a tag reader, such as a tag reader that is used to control access restricted areas. Other tag readers may be provided that record the presence of a user at a particular location in the facility. At step 411, after a predetermined time has elapsed each member of the group is transmitted a first signal reflecting to the user or users in a group that the expiration time is approaching—comprising a warning period—and the lights change from a neutral color such as green or blue to the color yellow. Next, at step 415 after a warning time period has expired, a second signal is transmitted to wristband to change the color from yellow to red. In an optional step, after a third time period has elapsed, a third signal is sent to wristband that instructs the logic to cause the red lights on the band to flash or blink on and off. At step 420 the flashing red signal may be deactivated by the staff at a point of sale location. Alternatively, the user may interact with a tag reader located outside of the restricted area to turn off the blinking red lights.

Figure 5:
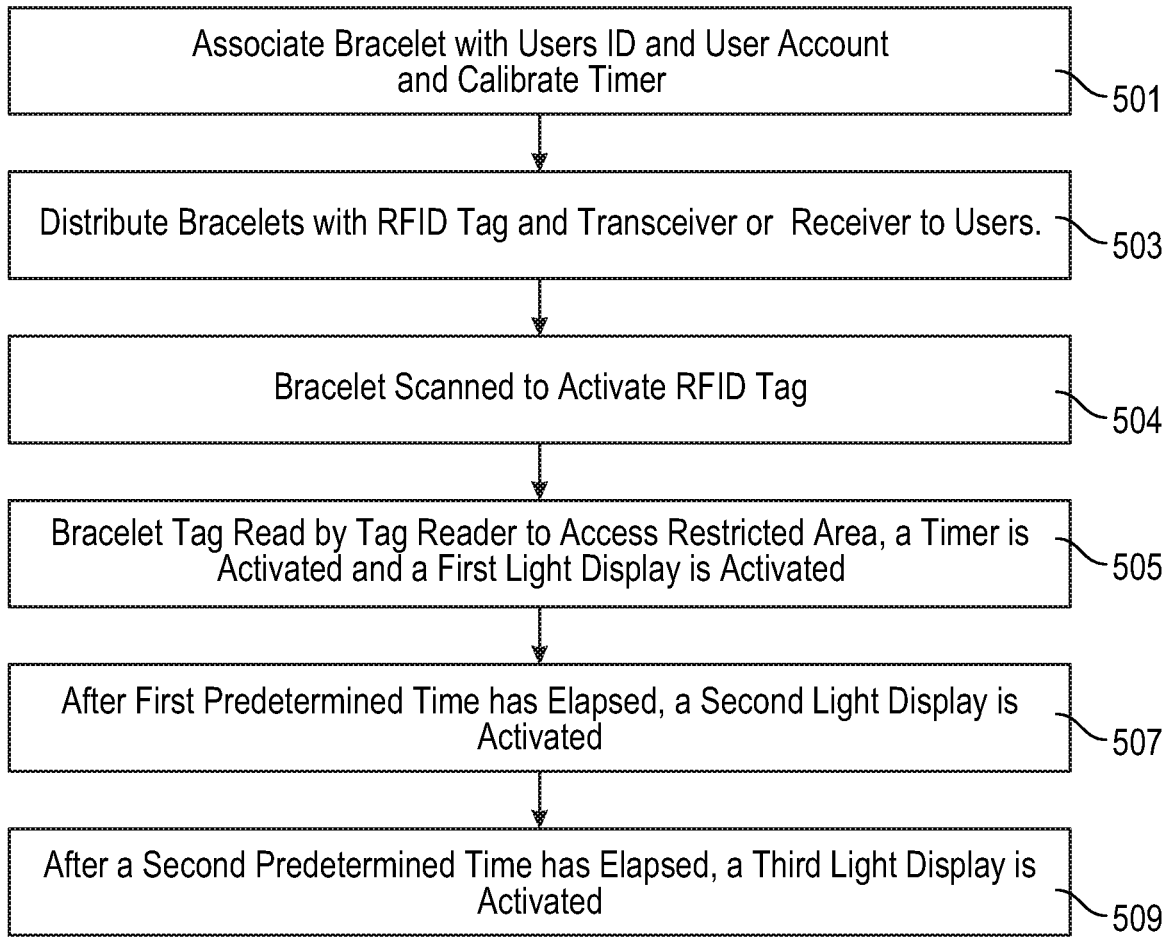
FIG. 5 is a flow chart describing the steps of a further method of an embodiment of the invention.

Now referring to FIG. 5, a further alternative method 500 is illustrated wherein wristbands are provided with a timer is disclosed In this method, a bracelets are provided with unique IDs and a timer is calibrated at step 501. At step 503 the timer is distributed to users and the users are associated with a group. At step 504, the bracelet is scanned and activated. At step 505, the wristband RFIS tag is read by tag reader terminal and the light element on the wristband is illuminated a first color such as green or blue. At step 507, after predetermined time as measured by the timer has elapsed, the wristband display will turn to yellow. When a further predetermined time has elapsed, at step 509, and the time period allowed for the restricted area has elapsed the color will change to red. This embodiment has the advantage of not requiring a separate a receiver for the reception of control signals from a central server to the wristband and its related cost. In a related alternative embodiment of this method, the timer and first lighting sequence are activated when the bracelet is distributed. The tag reader reads the RFID tag at the access location to allow entry. As used herein, the term light display can be a single display of color, a combination of colors and different blinking sequences. A display may be any array of LEDs, including LEDs that make up a LED screen such as those used on smart watches.

Figure 6:
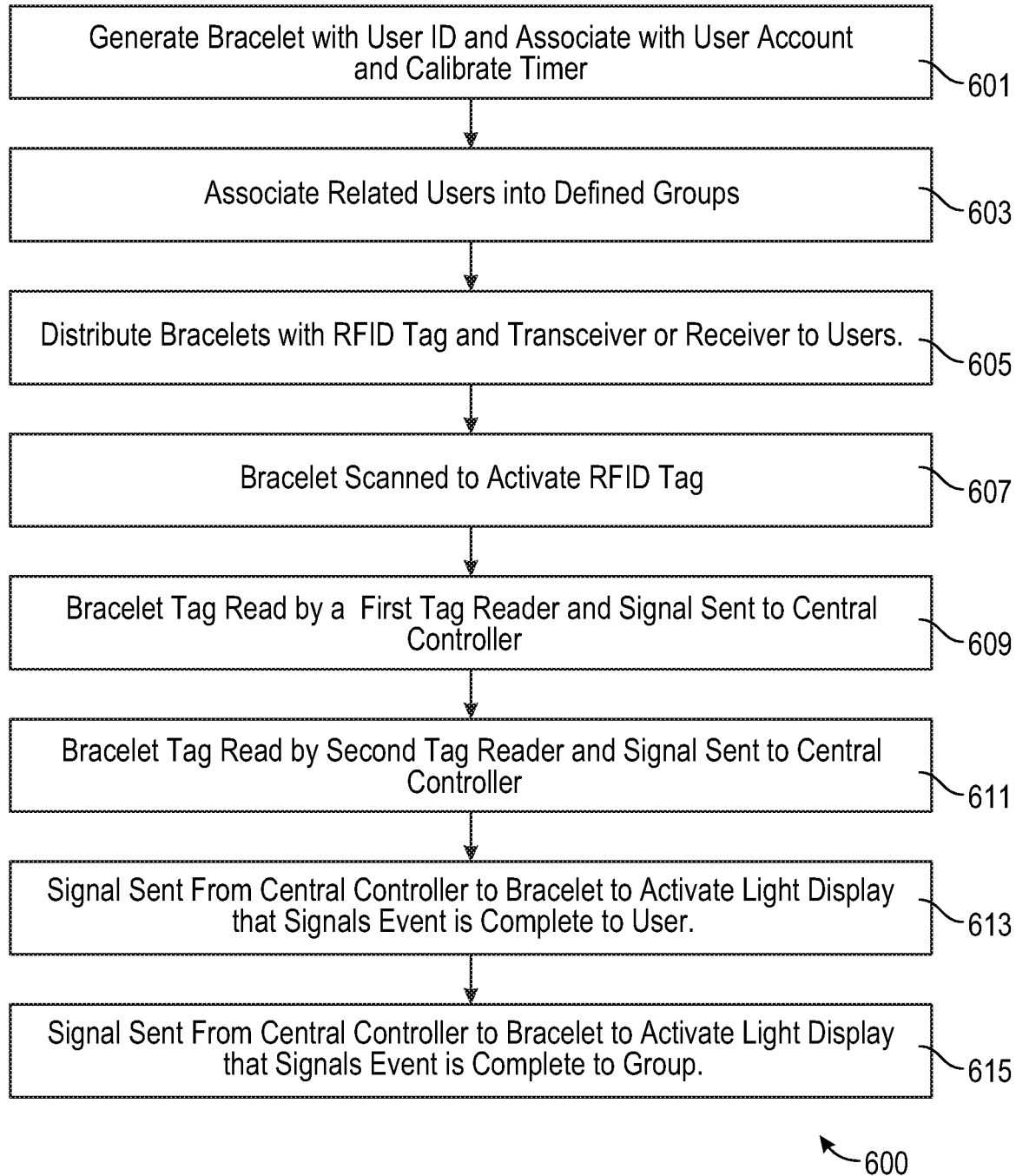
FIG. 6 is a flow chart describing a further method of an embodiment of the invention.

Referring now to FIG. 6, in a further method 600 of invention, the central controller tracks the progress of a user using wearing an RFID tag through a series of attractions, obstacles or elements ("event"), each of which comprises a tag reader. When an element has been completed, as may be reflected by the interaction with a tag reader at the end of a course, the wristband will illuminate and signal an achievement. At step 601 the user is provided with the wristband having a unique identification. At step 603 the user and unique identification is associated with a group. Next, at step 605, a wristband is distributed to members of the group. At step 607 the bracelet is scanned to activate et the RFID tag at a check-in station. Next, at step 609 the bracelet is scanned a tag reader after successfully completing a first event or course, and the tag reader sends a signal to a central control station. At step 611 the user accesses a second tag reader after completion of a second event and the tag reader sends second signal to the central control station. After a predetermined number of readers have been accessed by a particular wristband, the central server sends a signal back to wristband to signal the sequence is completed and a light sequence is activated at step 613. When a first member has completed the event sequence, the central control station then sends a signal to all member of the group at step 615. The tag readers may be configured to measure the time between access and entry to a course and the exit of the course and the time may be used in connection with the determination of an award or prize. When all of the events are completed as confirmed by access to tag readers, the wristband will provide a signal and the wearer then returns to the check-in station for an award or prize and resets the device for a new game or challenge. In alternative embodiments, any member of a predefined team may activate the tag reader, and when all of the designated tag readers have been accessed, a signal is simultaneously transmitted to all member of the team, reflecting he successful completion of a contest or event, and signals a summons to the users to return to a home location. First second and third place finishes may be reflected by different colors on the wristband.

While embodiments of the invention disclosed above contemplates that the tag reader sends signals to a central controller with data relating to tags that have been read, in an alternative embodiment, a signal is sent from the wristband after a tag has been read. In other contemplated embodiments, the wristband is configured as a tag reader to sense tags provided in the environment, and the wristband can alter its display based upon the reading of a tags in the environment and send a signals to a central computer.

In a further method of use, a "treasure hunt" or "scavenger hunt" game may be implemented where a user is provided a first clue to find a first tag reader. At the first tag reader after a tag has been read, the user is then provided a second clue to the location of a second tag reader. The user then progresses to subsequent tag readers in a predetermined order until a final tag reader is accessed. The tag readers send signals to the central controller reflecting when tags are read. After a final tag is read, a signal is sent to the individual wearing the wristband that has scanned the final tag reflecting the successful completion of a sequence. The bracelet will also send a signal to the controller that indicated a first player that has sequentially activated each of the designated tag readers. The tag readers may be located at remote areas in a park requiring the user to run, climb and navigate obstacles to reach the tag reader. In further alternative embodiments, the user may have to solve a problems or puzzle to access the tag reader, such as found in an escape room.

In a contemplated children's safari game, a child is given instructions to identify a sequence of items, such as animal models. The child then finds the matching animal and puts his or her wristband next to a tag reader and the band is illuminated a color reflecting the correct identification. The illumination is then extinguished and the child proceeds to the next animal on the instruction map for the safari and proceeds until all of the animals are located. In embodiments, the wristband may have a sequence of numbers or symbols that are illuminated and remain illuminated.

In an alternative embodiment the wristband comprises a transceiver wherein the wristband has a communication device that includes a single element that functions as both a transmitter and receiver that are provided in a single package. For example, the STKNX is one of the smallest KNX transceiver now available as it uses a VQFNPN24 package of only 4 mm×4 mm. KNX which is an abbreviation for Konnex, a comprehensive protocol for building automation. It uses an international open standard officially approved in Europe, China, and the United States. The STKNX is made by STMicroelectronics which has sales offices at 550 St. Charles Dr, Suite 200, Thousand Oaks, Calif. 91360-582. The wristbands described above are useful in a number of methods as described herein.

In a further method of the invention, time-based activity can be monitored at individual level without having a human timekeeper monitoring the individual user time. As soon as the wristband is issued to a user at the entrance of time-based activity area, time tracking will be triggered. Server software keeps track of the time, and it will communicate with wristband to alert of time expiry. The wristband will activate the visual LED patterns to indicate the event to user. The person monitoring a play area or other confined region can easily track users whose time is lapsed and ask them to leave the activity area.

In a group activity such as paint ball, laser game or escape room where in individual performance needs to be tracked, visual indication can be activated to provide performance feedback in real-time. For example, a color grading from green to red could be indicated on the wristband that indicates the relative performance of a user within the group. If a user is required to be "out" of the activity based on his performance, a signal is sent tracked players wristband and he/she may be removed from the group by staff.

In the above instances, user identifiable information is not required to be captured by the system in order to identify a user. The entire process is electronically driven ensuring customer privacy to the maximum. This is especially important as most of the affected customers are children.

Figure 7:
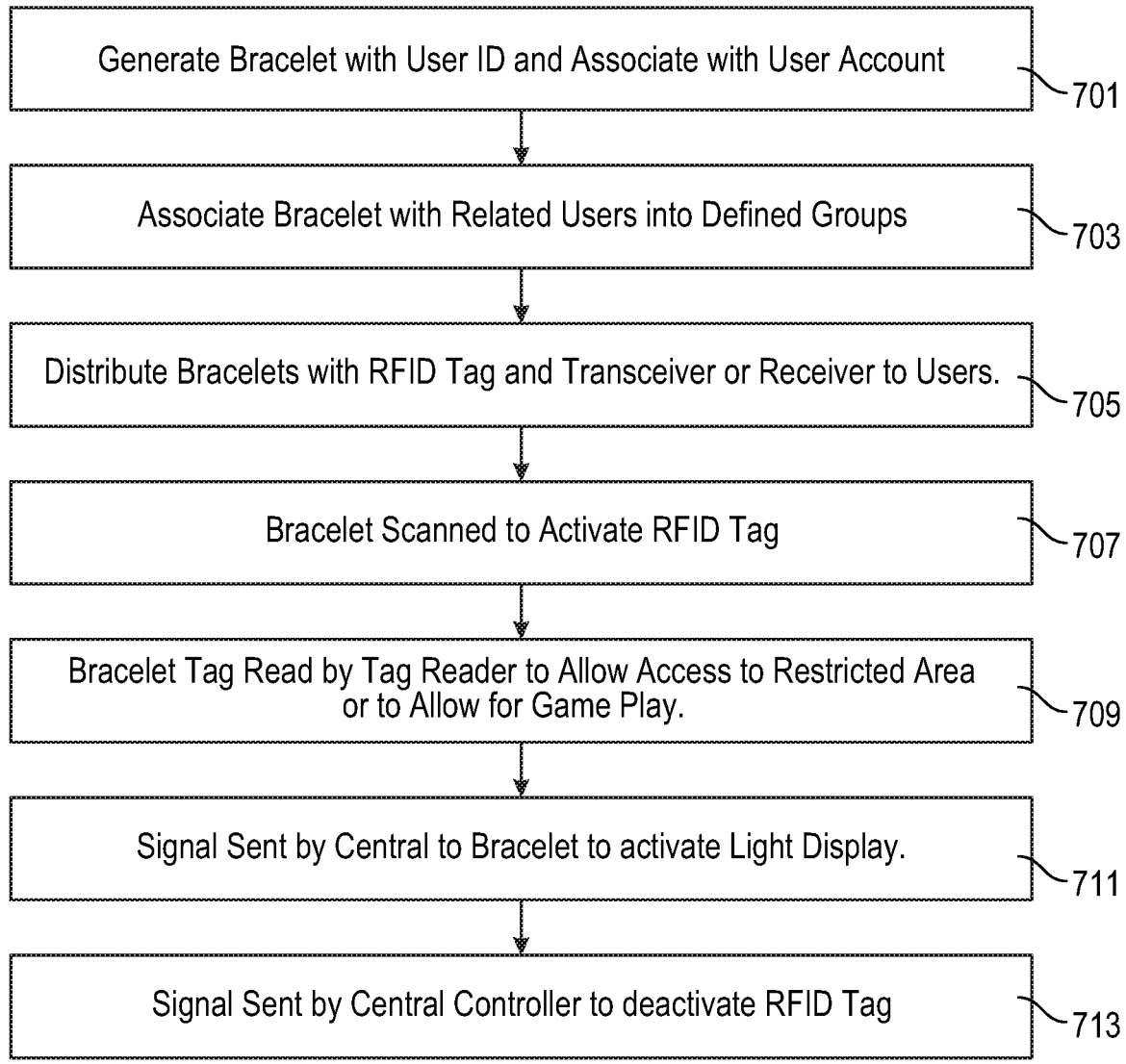
FIG. 7 is a flow chart describing a further method of an embodiment of the invention.

As shown in FIG. 7, in n yet a further method, the system can be used to coordinate group activities in which every member of a group is required to be present for an event or group activity and they are spread across a facility. Steps 701, 703, 705 and 707 reflect the same sequence as steps 601, 603, 605 and 607. At step 709, the bracelet may be used to access a restricted area by interaction with a tag reader. At step 711, the time of a group event, all of the wristbands that are associated with a defined group are sent a signal and that activates a light display. The significance of the color patterns and light sequence is explained to the group during the check-in process and reminders may be posted with signage in the facility. At step 713, as discussed above, when it is time for a scheduled group activity, the RFID tag can be disabled or not recognized thereby restricting access to areas or preventing the users from performing individual activities by disabling the RFID function, and since there is no ability to perform individual activities, the individual is more likely to timely attend the group activity. For example, at a birthday party event when all children are playing the arcade games in a family entertainment center using RFID enabled wristbands for game access, when it is time for cutting the cake or having the meal, all children can be gathered at the party hall by indicating a red flash on their wristbands, and disabling further game play. Once the meal is over, the tag may be reactivated and gameplay can be resumed.

It will be evident to those skilled in the art that the systems and methods can be adapted for use in a wide range of retail facility contexts, including concerts, tracks, water parks, amusement parks, mini golf, trampoline parks, climbing centers, and sporting events. For the purposes of this disclosure RFID refers to Radio Frequency Identification and RFID tag means an object having an RFID chip. Although the embodiments disclosed are directed to RFID wristbands or bracelets, it will be understood that other elements such as lanyards and other devices that has the capability to incorporate an RFID chip and a LED display may be also be suitable for the methods and systems of the present disclosure. The term wristband and bracelet are used interchanges and refer to any device that can be worn or attached to a patron wrist.

As described above, embodiments of the invention include middleware for using RFID wristband not only for access to restricted areas but also for conducting retail transactions. Middleware describes computer software that provides services to software applications beyond those available from the operating system and is commonly used for communication and management of data in distributed applications. Services that can be regarded as middleware include enterprise application integration, data integration, message-oriented middleware (MOM), object request brokers (ORBs), and the enterprise service bus (ESB).

In addition to the foregoing embodiments, the present disclosure provides programs stored on machine readable medium to operate computers and devices according to the principles of the present disclosure. Machine readable media include, but are not limited to, magnetic storage medium (e.g., hard disk drives, floppy disks, tape, etc.), optical storage (CD-ROMs, optical disks, etc.), and volatile and non-volatile memory devices (e.g., EEPROMs, ROMs, PROMs, RAMs, DRAMs, SRAMs, firmware, programmable logic, etc.). Furthermore, machine readable media include transmission media (network transmission line, wireless transmission media, signals propagating through space, radio waves, infrared signals, etc.) and server memories. Moreover, machine readable media includes many other types of memory too numerous for practical listing herein, existing and future types of media incorporating similar functionally as incorporate in the foregoing exemplary types of machine-readable media, and any combinations thereof. The programs and applications stored on the machine-readable media in turn include one or more machine executable instructions which are read by the various devices and executed. Each of these instructions causes the executing device to perform the functions coded or otherwise documented in it. Of course, the programs can take many different forms such as applications, operating systems, Perl scripts, JAVA applets, C programs, compilable (or compiled) programs, interpretable (or interpreted) programs, natural language programs, assembly language programs, higher order programs, embedded programs, and many other existing and future forms which provide similar functionality as the foregoing examples, and any combinations thereof.

Many modifications and other embodiments of the systems and methods described herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A method of communication to a plurality of users in a defined group from a central controller device comprising;
   providing a personal communication device to each said user,
   said personal communication device comprising a unique RFID tag, a receiver, a processor, and a display, said RFID tag configured to be recognized by a plurality of tag reader devices,
   creating an associated user account for each said user, said account comprising user identity information and associated credit information and creating an association with said defined group,
   activating each said RFID tag associated with said group of said personal communication devices assigned to members of the group,
   transmitting to said central controller device a signal from said RFID tag reader device in response to said tag reader device detecting said RFID tag from a member of said group, and
   in response to the reception of said signal from said RFID tag reader, said central controller simultaneously transmitting a first instruction signal to each said personal communication device in said group with instructions for said processor to illuminate each said display with an identical predetermined light sequence, and
   further transmitting a signal from said central controller to said personal communication device to deactivate each said RFID tag associated with said group.

2. A method of communication between a user having a personal communication device and a central controller and a plurality of RFID tag reader devices, said personal communication device comprising a RFID tag, a receiver and a display light, said method comprising,
   in response to scanning said RFID tag by a first RFID tag reader, a first reporting signal is transmitted from said tag reader to said controller and,
   in response to the detection of said first reporting signal, said controller transmits a first instruction signal to said personal communication device, and
   in response to receiving said first instruction signal from said controller, said personal communication device displays a first illumination sequence visible to said user,
   and said controller transmits a signal to deactivate said RFID tag after the reception by the central controller of a predetermined sequence of signals from a plurality of different at RFID tag readers each reflecting a separate tag detection.

3. A method of communication between a user having a personal communication device and a central controller and a plurality of RFID tag reader devices, said personal communication device comprising a RFID tag, a receiver and a display light, said method comprising,
   in response to scanning said RFID tag by a first RFID tag reader, a first reporting signal is transmitted from said tag reader to said controller and,
   in response to the detection of said first reporting signal, said controller transmits a first instruction signal to said personal communication device, and
   in response to receiving said first instruction signal from said controller, said personal communication device displays a first illumination sequence visible to said user,
   wherein after a user scans a first tag reader with a personal communication device, the user is provided with feedback and instructions to locate at least one additional tag reader, and after a predetermined number of subsequent scans of additional tag readers, an endpoint signal is transmitted to said central controller, and
   in response to receiving said endpoint signal, said central controller sends an endpoint signal to all personal communication devices that are in a defined group and said endpoint signal provides an instruction to said processor of personal communication device to display an endpoint light sequence on each said personal communication devices in said group.

4. A method of communication to a plurality of users in a defined group from a central controller device comprising;
   providing a personal communication device to each said user,
   said personal communication device comprising a unique RFID tag, a receiver, a processor, and a display, said RFID tag configured to be recognized by a plurality of tag reader devices,
   creating an associated user account for each said user, said account comprising user identity information and associated credit information and creating an association with said defined group, activating each said RFID tag associated with said group of said personal communication devices assigned to members of the group, transmitting to said central controller device a signal from a RFID tag reader device in response to said tag reader device detecting an RFID tag from a member of said group, and in response to the reception of said signal from said RFID tag reader, said central controller simultaneously transmitting a first instruction signal to each said personal communication device in said group with instructions for said processor to illuminate each said display with an identical predetermined light sequence, and further transmitting a signal from said central controller to said RFID tag reader with an instruction to said tag readers to no longer recognize the RFID tags in said group.

* * * * *